(12) United States Patent  (10) Patent No.: US 7,590,419 B2
Chen  (45) Date of Patent: Sep. 15, 2009

(54) FREQUENCY CORRECTION CHANNEL BURST DETECTOR IN A GSM/EDGE COMMUNICATION SYSTEM

(75) Inventor: Weizhong Chen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 249 days.

(21) Appl. No.: 11/433,590

(22) Filed: May 12, 2006

(65) Prior Publication Data

US 2007/0274477 A1    Nov. 29, 2007

(51) Int. Cl.
    *H04W 4/00*    (2009.01)
(52) U.S. Cl. .................................. 455/434; 379/390.02
(58) Field of Classification Search ............. 379/390.02
    See application file for complete search history.

(56) References Cited

U.S. PATENT DOCUMENTS

2003/0235312 A1    12/2003    Pessoa et al.

2007/0265791 A1 *   11/2007    Valadon ....................... 702/76

FOREIGN PATENT DOCUMENTS

EP        0 622 962 B1     4/2000
EP        1 395 065 A1     3/2004

* cited by examiner

*Primary Examiner*—Alexander Jamal
(74) *Attorney, Agent, or Firm*—Dillon & Yudell LLP

(57) ABSTRACT

A FCCH Burst detector includes a tone detection filter centered at 67.7 KHz, a tone rejection filter centered at −67.7 KHz, moving average power calculation for the two filter outputs, and a detection logic. A FCCH burst is detected when the ratio of the moving average power of the tone detection filter output to that of the tone rejection filter output is larger than a threshold for a period longer than a threshold. The FB tone end time is detected when the ratio falls back to a threshold or the moving average power of the tone detection filter output falls below a threshold of the average power of the tone detection filter output over a predetermined period. The tone detection filter and the tone rejection filter is implemented by first frequency-shifting the received signal by −67.7 KHz and +67.7 KHz in parallel, then passing the two frequency-shifted signals through two separate low-pass filters.

23 Claims, 5 Drawing Sheets

FREQUENCY CORRECTION CHANNEL BURST DETECTOR IN A GSM/EDGE COMMUNICATION SYSTEM

BACKGROUND OF THE INVENTION

1. Field of the Invention

The present invention relates in general to digital communication systems, and in particular, to mobile radio digital communication systems. Still more particularly, the invention relates to a method of reception in a receiver of a mobile radio digital communication system.

2. Description of the Related Art

The most widespread standard in cellular wireless communications is currently the Global System for Mobile Communications (GSM). GSM employs a combination of Time Division Multiple Access (TDMA) and Frequency Division Multiple Access (FDMA) for the purpose of sharing the spectrum resource. GSM networks typically operate in the 900 MHz and 1900 MHz frequency ranges. For example, GSM-900 commonly uses radio spectrum in the 890-915 MHz bands for the uplink (Mobile Station to Base Transceiver Station) and in the 935-960 MHz bands for the downlink (base station to mobile station), providing 124 RF channels spaced at 200 kHz, and GSM-1900 uses the 1850-1910 MHz bands for the uplink and 1930-1990 MHz bands for the downlink. The spectrum for both uplink and downlink is divided into 200 kHz-wide carrier frequencies using FDMA, and each base station is assigned one or more carrier frequencies. Each carrier frequency is divided into eight time slots using TDMA such that eight consecutive time slots form one TDMA frame with a duration of 4.615 ms. A physical channel occupies one time slot within a TDMA frame. Each time slot within a frame is also referred to as a "burst." TDMA frames of a particular carrier frequency are numbered and formed in groups of 26 or 51 TDMA frames called multi-frames.

GSM systems typically employ one or more modulation schemes to communicate information such as voice, data, and/or control information. These modulation schemes may include GMSK (Gaussian Minimum Shift Keying), M-ary QAM (Quadrature Amplitude Modulation) or M-ary PSK (Phase Shift Keying), where $M=2^n$, with n being the number of bits encoded within a symbol period for a specified modulation scheme. The most common modulation scheme, GMSK, is a constant envelope binary modulation scheme allowing raw transmission at a maximum rate of 270.83 kilobits per second (Kbps).

Wireless communication systems are placing an ever-increasing demand on capacity to transfer both voice and data services. While GSM is efficient for standard voice services, high-fidelity audio and data services demand higher data throughput rates. The General Packet Radio Service (GPRS), EDGE (Enhanced Data rates for GSM Evolution) and UMTS (Universal Mobile Telecommunications System) standards have been adopted to increase capacity in GSM systems.

General Packet Radio Service (GPRS) is a non-voice service that allows information to be sent and received across a mobile telephone network. It supplements Circuit Switched Data (CSD) and Short Message Service (SMS). GPRS employs the same modulation schemes as GSM, but higher data throughput rates are achievable with GPRS since it allows for an entire frame (all eight time slots) to be used by a single mobile station at the same time.

EDGE (Enhanced Data rates for GSM Evolution) and the associated packet service EGPRS (Enhanced General Packet Radio Service) have been defined as a transitional standard between the GSM/GPRS (Global System for Mobile Communications/General Packet Radio Service) and UMTS (Universal Mobile Telecommunications System) mobile radio standards. Both GMSK modulation and 8-PSK modulation are used in the EDGE standard, and the modulation type can be changed from burst to burst. GMSK is a non-linear, Gaussian-pulse-shaped frequency modulation, and 8-PSK modulation in EDGE is a linear, 8-level phase modulation with $3\pi/8$ rotation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical.

In GSM/EDGE, frequency bursts (FB) comprising a single tone, which corresponds to all "0" payload and training sequence, are sent regularly by the Base Station (BS) to allow Mobile Stations (MS) to synchronize their Local Oscillator (LO) to the Base Station LO, using frequency offset estimation and correction. The all zero payload of the FB is a constant frequency signal, or a single tone burst. When the MS is power mode, it hunts continuously for a FB from a list of carriers. When the FB is detected, the MS will estimate the frequency offset relative to its nominal frequency, which is 67.7 KHz from the carrier. This estimated frequency offset will be used to correct the MS LO. In power up mode, the frequency offset can be as much as +/−19 KHz. In a standby mode, the MS will periodically wakeup to monitor the frequency burst to maintain its synchronization. In the standby mode, the frequency offset is within ±2 KHz.

While detecting the presence of a FB and estimating the frequency of the FB single tone, the MS also estimates the starting or ending time of the FB to provide a coarse timing of the FB. This coarse timing is used to locate a synchronization burst, called a SCH burst, that follows the detected FB. The synchronization burst is used to derive a fine tuned timing to schedule the following normal burst processing. The SCH also provides a base station ID. As can be seen, frequency channel burst detection is an important function of GSM/EDGE phones.

The FB sent from the base station is a single tone at ¼ symbol rate or 67.7 KHz relative to the carrier frequency. The base station carrier frequency is specified to be better than 0.05 ppm or less than ±45 Hz uncertainty for 900 MHz carriers and less than ±90 Hz uncertainty for 1900 MHz carriers. For a 10 ppm MS local oscillator, a FB is observed at MS as a 67.7 KHz tone with a ±19 KHz uncertainty for 1900 MHz carriers.

If the received signal is sampled at the symbol rate of 270.83 KHz, the nominal frequency of the FB will be at ¼ of the sampling rate. Thus, in the normalized frequency domain, the nominal frequency of the FB tone will be exactly at ½π. The frequency uncertainty is ±19 KHz in power-up mode and ±2 KHz in standby mode, which are equivalent to the uncertainty of ±25.26° and ±2.66° respectively in the normalized frequency domain. Accordingly, the frequency search window for FB detection is centered at ½π with a width of ±25.26° and ±2.69° in the power-up mode and standby mode respectively, and the estimation error is required to be less than 100 Hz or 0.0665°.

In GSM/EDGE, FBs are allocated through the Frequency Correction CHannel (FCCH), as shown in FIG. 1. A FCCH burst in GSM/EDGE has a duration of 576.92 us, which is equivalent to 156.25 symbol periods with a 270.83 KHz symbol rate. As explained above, the FB is a single tone signal at 67.7 KHz relative to the carrier center, and the carrier center of the received signal could have a variation between ±19 KHz due to the MS's LO uncertainty in power-up mode and a variation within ±2 KHz while in standby mode.

FIG. 1 shows the Frequency Correction CHannel (FCCH) structure within each Multi-Frame transmitted over the channel. The Multi-Frame 90 has 51 TDMA frames, including five TDMA frames carrying frequency bursts (FBs). As exemplified in FIG. 1 by the expanded frame 20, each Frame is shown with its eight time slots 0-7. The first time slot of each of the 0, 10, 20, 30 and 40$^{th}$ TDMA Frames contains the FB. As further exemplified in FIG. 1 by expanded time slot 0 of frame 20, each FB contains 142 "0" bits in the place of payload and training sequence in normal bursts, and three tail bits at both the front and end of the FB, which are also "0" bits. FIG. 1 also shows frame 41 of the multi-frame expanded to show eight time slots 0-7, including the synchronization channel (SCH) at time slot 0 of frame 41.

Detection of the FB is complicated by the fact that the burst has a wide frequency uncertainty window (±19 KHz) relative to 200 KHz bandwidth of the channel. Consequently, detecting the presence of the FB and its arrival time has previously required multifaceted electronic circuits that significantly impact the performance of the subsequent normal burst recovery and power consumption. Conventional FB detectors use a pole-adaptation approach operating on the real-valued signal to detect the presence of the single tone burst. The tone signal power is estimated and compared with the total signal power received. Estimating the tone power relies on the tone frequency estimation derived from phase differences of neighboring samples of the received signal. Pole adaptation attempts to drive an IIR filter to be centered at the tone frequency. However, this pole adaptation is based on localized signal statistics, thus is subject to noise and interference disturbance. Considering the fact that the received signal always contains the receiver thermal noise and interference, very complicated circuitry is involved in the pole adaptation. Even with the additional circuitry, the solution is still limited due to the fundamental limitations with the approach. It is observed that the prior art solutions result in high power consumption and low performance, especially in harsh fading environment. What is needed is a low cost, low power consumption and high performance FB detection solution that will improve the consumer experience.

BRIEF DESCRIPTION OF THE DRAWINGS

This invention is described in a preferred embodiment in the following description with reference to the drawings, in which like numbers represent the same or similar elements and one or a plurality of such elements, as follows.

Figure 1:
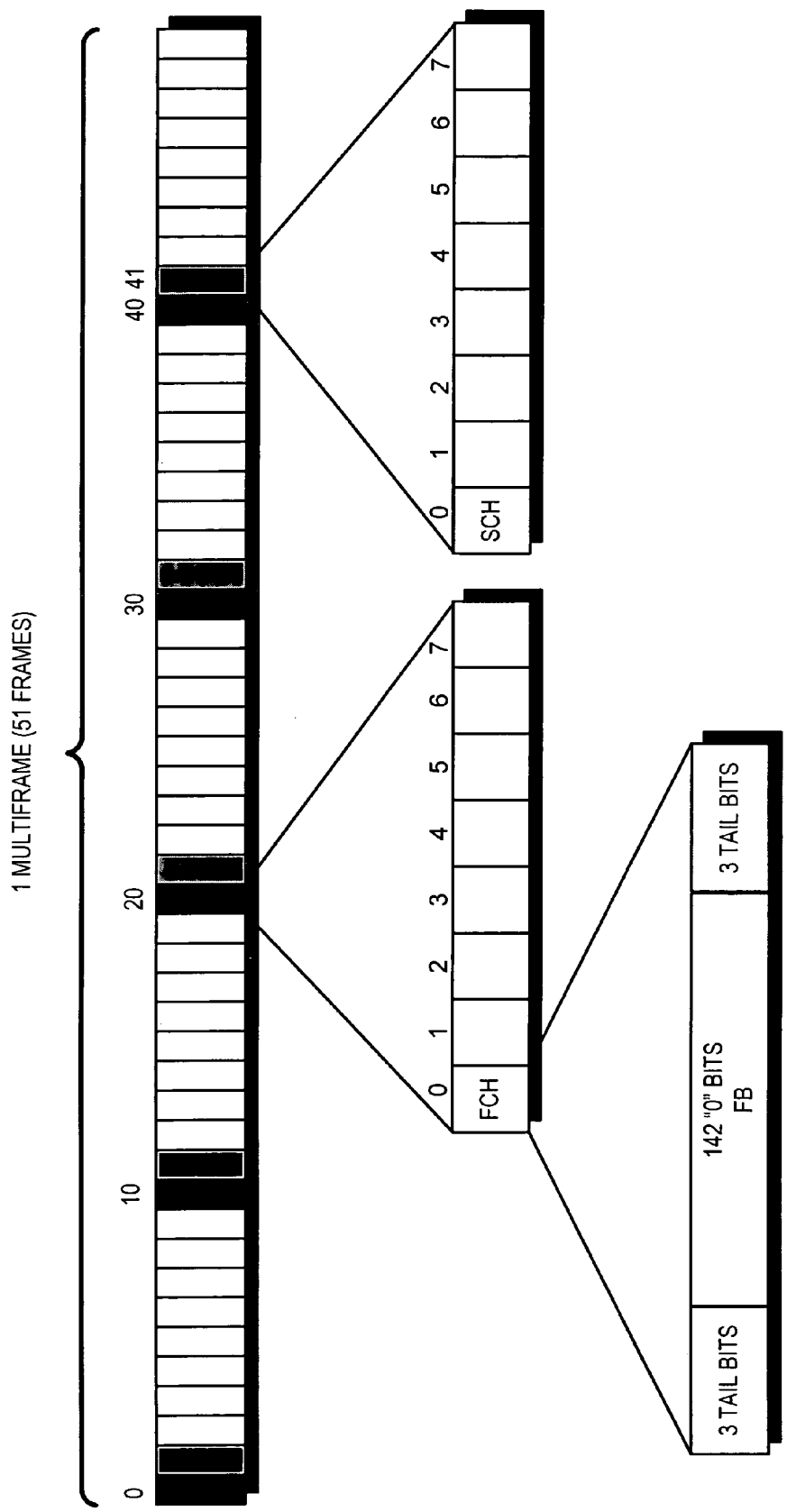
FIG. 1 shows the Frequency Correction CHannel (FCCH) structure within each Multi-Frame transmitted over the channel.

In the accompanying drawings, elements might not be to scale and may be shown in generalized or schematic form or may be identified solely by name or another commercial designation.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and that it has application to other embodiments of electronic devices such as portable digital assistants, digital cameras, portable storage devices, audio players and portable gaming devices, for example.

Preferred embodiments of the present invention are efficient and high performance solutions for the detection of the presence of the FB and arrival timing. Assuming the Hz, two filters are designed to filter the received signal x(n), which is a complex valued signal sampled at 67.7 K, in parallel. The first filter is centered at 67.7 KHz, the FB tone's nominal frequency, and the second filter is centered at −67.7 KHz. The first filter serves the purpose of detecting the FB tone signal power, and the second filter estimates the thermal noise and interference signal power. A FB tone is detected when the power of the first filter is persistently larger than the power of the second filter.

In one embodiment, the operation of the first filter is first to left-shift the received signal by 67.7 KHz, the filtered signal is can be represented by $$x_l(n)=x(n)e^{-jn\pi/2}=x(n)j^{-n}$$

The first filter operating on the original signal is now equivalent to a filter centered at 0 KHz on the left-shifted signal $x_l(n)$. The filter centered at 0 KHz can be implemented as a simple low-pass filter.

In one embodiment, the operation of the second filter is first to right-shift the received signal by 67.7 KHz, the filtered signal is can be represented by $$x_r(n)=x(n)e^{jn\pi/2}=x(n)j^{n}$$

The second filter operating on the original signal is now equivalent to a filter centered at 0 KHz on the right-shifted signal $x_r(n)$. The filter centered at 0 KHz can be implemented as a simple low-pass filter.

As a consequence of the left-shifting and right-shifting of the received signal, the first filter and second filter are implemented as identical low pass filters operating on two data streams in parallel. As will be appreciated, the process of left-shifting and right-shifting the received signal by 67.7 KHz involves no arithmetic operations.

In operation, the FCCH Burst detector of a preferred embodiment of the present invention shifts the received signal, both left and right, by 67.7 kHz in frequency to produce two parallel data streams. This frequency shift moves the FB tone signal from the center of the nominal frequency to a zero offset relative to the carrier center, and involves only reordering the real and imaginary part of each received signal sample without modification of the received signal value or arithmetic operations thereupon. The two data streams, left shifted version and right shifted version are then both applied to separate single-pole low-pass filters. The low-pass filter to the left shifted version can be considered a tone detection filter, while the low-pass filter to the right shifted version can be considered a tone rejection filter. The magnitude or magnitude squared are calculated for both the tone detection filter output and the tone rejection filter output. The results of the magnitude or magnitude squared of the tone detection and tone rejection filters are then passed through a low pass filter to estimate the tone power and interference power. If the estimated tone power is consistently larger than the estimated interference power for a threshold period of time, the tone presence is detected. Further, the tone's end-time is detected when the estimated tone power falls back to a different threshold level.

Figure 2:
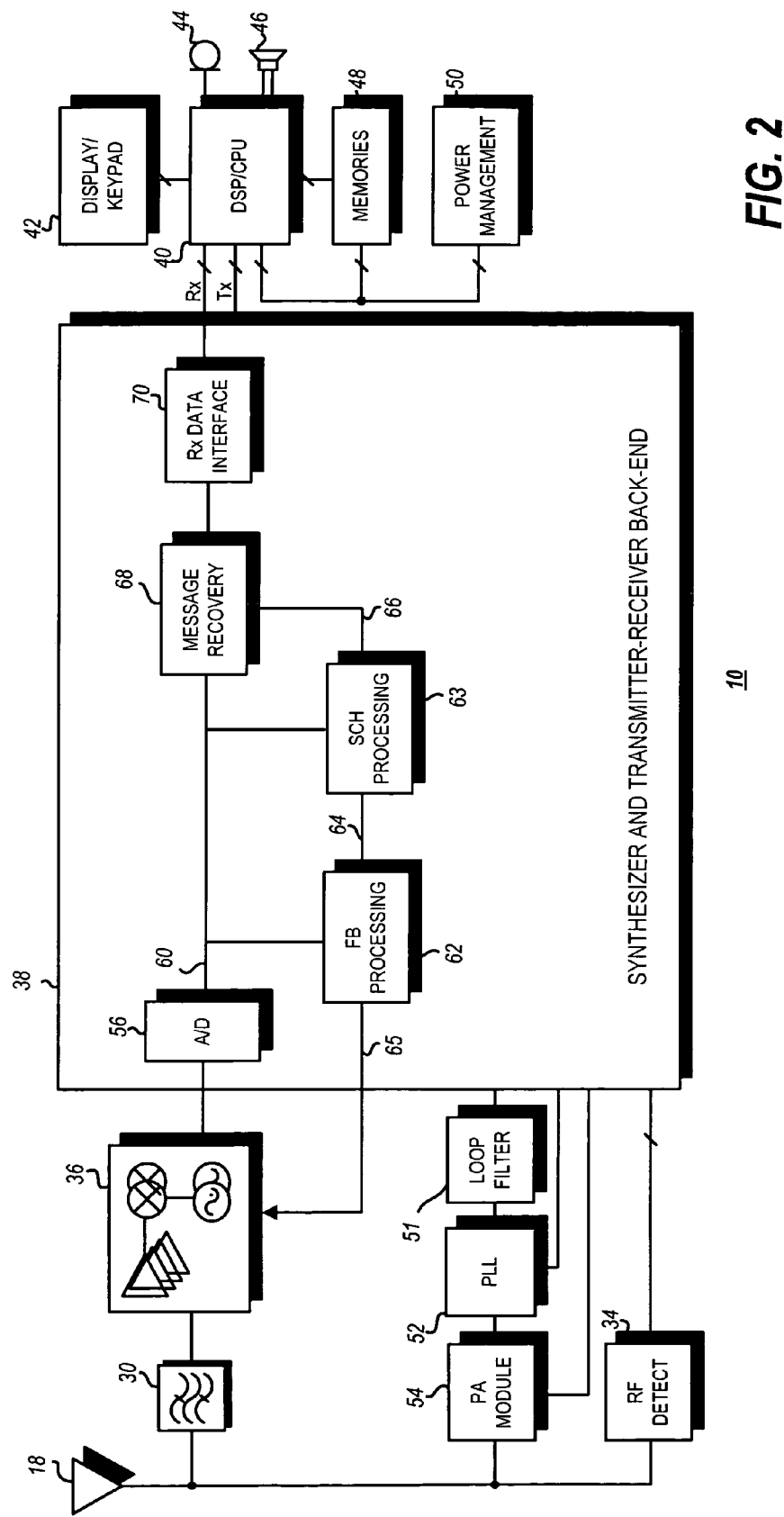
FIG. 2 shows a block diagram of a wireless mobile communication device, in accordance with a preferred embodiment of the present invention.

With reference now to the Figures, and in particular in reference to FIG. 2, there is shown a block diagram of a wireless mobile communication device, in accordance with a preferred embodiment of the present invention. In this embodiment, the wireless mobile communication device 10 may be, for example, a cellular handset, a wireless-enabled laptop computer, a one or two-way pager, or some other wireless communication device. In a preferred embodiment, wireless communication device 10 is configured for EDGE operation in either a GMSK or 8-PSK modulation mode.

Wireless mobile communication device 10 generally comprises antenna 18 coupled to a filter 30, a power amplifier (PA) 54, and a radio frequency (RF) detector 34. Filter 30 is coupled to receiver (Rx) front-end block 36, which contains standard receiver components such as gain stages, mixers, oscillators, etc., as generally depicted, and mixes the received RF transmission down to base band. Rx front-end block 36 has an output coupled to a synthesizer and transmitter/receiver (Tx/Rx) back-end block 38, which in turn is coupled to a digital signal processor/central processing unit (DSP/CPU) 40 over transmit (Tx) and receive (Rx) connections, or alternatively a communications bus (not shown). The synthesizer and Tx/Rx back-end block 38 is also coupled through loop filter 51 to a phase lock loop (PLL) 52 that generates RF transmission signals for amplification by power amplifier (PA) module 54 and transmission over antenna 18. The receiver front-end block 36 and synthesizer and transmitter/receiver back-end block 38 are preferably integrated circuits (ICs), although other embodiments may be implemented.

DSP/CPU 40 has memories 48 associated therewith, for example read-only memory (ROM) and read/write random access memory (RAM). Various input and output devices are coupled to the CPU, including a display and keypad referenced with a common identifier 42, a microphone 44 and speaker 46. The exemplary embodiment also includes a power management module 50.

Synthesizer and Tx/Rx back-end block 38 is shown containing the block components of a message recovery path coupling receiver front-end block 36 to a receive (Rx) input of DSP/CPU 40. As will be appreciated by those skilled in the art, Synthesizer and Tx/Rx back-end block 38 is comprised of additional components that are not shown in FIG. 2 to simplify the following description of a preferred embodiment. Synthesizer and Tx/Rx back-end block 38 includes a plurality of modules, including blocks 56, 62, 66, 68 and 70, which can be implemented in hardware, software, or a suitable combination of hardware and software, and which, in a preferred embodiment, can be one or more software systems operating on a specific purpose processor platform (not shown) within wireless communication device 10 or, in an alternative embodiment, on DSP/CPU 40. As used herein, a software system can include one or more objects, agents, threads, subroutines, separate software applications, two or more lines of code or other suitable software structures operating in one or more separate software applications, on one or more different processors, or other suitable software architectures.

As seen within synthesizer and Tx/Rx back-end block 38, analog-to-digital (A/D) converter 56 is coupled to Rx front-end block 36 to digitally convert the received transmission signals into a digital data stream. A/D converter 56 is coupled to FB processing block 62, SCH processing block 63 and message recovery 68 via connection 60. FB processing block 62 receives the digital transmission data stream from A/D converter 56 to perform processing of the FB. SCH processing block 63 is coupled via connection 64 to FB processing block 62 to receive a coarse burst timing. SCH processing block 63 derives a fine-tuned burst timing used by the system to schedule the normal burst processing for message recovery block 68. FB processing block 62 is also coupled to Rx front-end block 36 via connection 65 to provide the estimated frequency offset to adjust the local oscillator signal (LO).

In accordance with the preferred embodiment of the present invention, FB processing block 62 performs an efficient FCCH burst detection having significant performance improvement over previous tone detection methodologies. The FCCH tone detector within FB processing block 62 includes two real, single-pole, low-pass, infinite-impulse response (IIR) filters, respectively, centered at $\pm\pi/2$ on the input signal. By centering each of the filters at $\pm\pi/2$, the filtered signals have the maximum separation of frequency, thus giving the optimal detection performance. For an efficient implementation, the filters are further configured to be two identical low pass filters or two filters centered at 0 KHz with the input signal being first left-shifted and right-shifted by 67 KHz.

The first filter (the "detection filter") detects the tone signal. The second filter (the "rejection filter") detects the general interference power in the channel outside of the frequency range of the tone burst. The FCCH tone burst is detected if the power of the detection filter output is consistently higher than that of the rejection filter output for a period longer than a threshold period of time. The end of the FCCH burst tone is detected if the power output of the detection filter falls back below a second threshold. Because the left-shifting and right shifting of the received signal, the tone detection filter and the tone rejection filter can be implemented with a single-pole low pass filter in the system of a preferred embodiment, thereby significantly reducing the complexity and cost of the electronic circuit. Moreover, by taking full advantage of both the available real and imaginary components of the received signal, the FCCH tone detector of the present invention has a significant performance gain, found to be greater than 5 dB.

Figure 3:
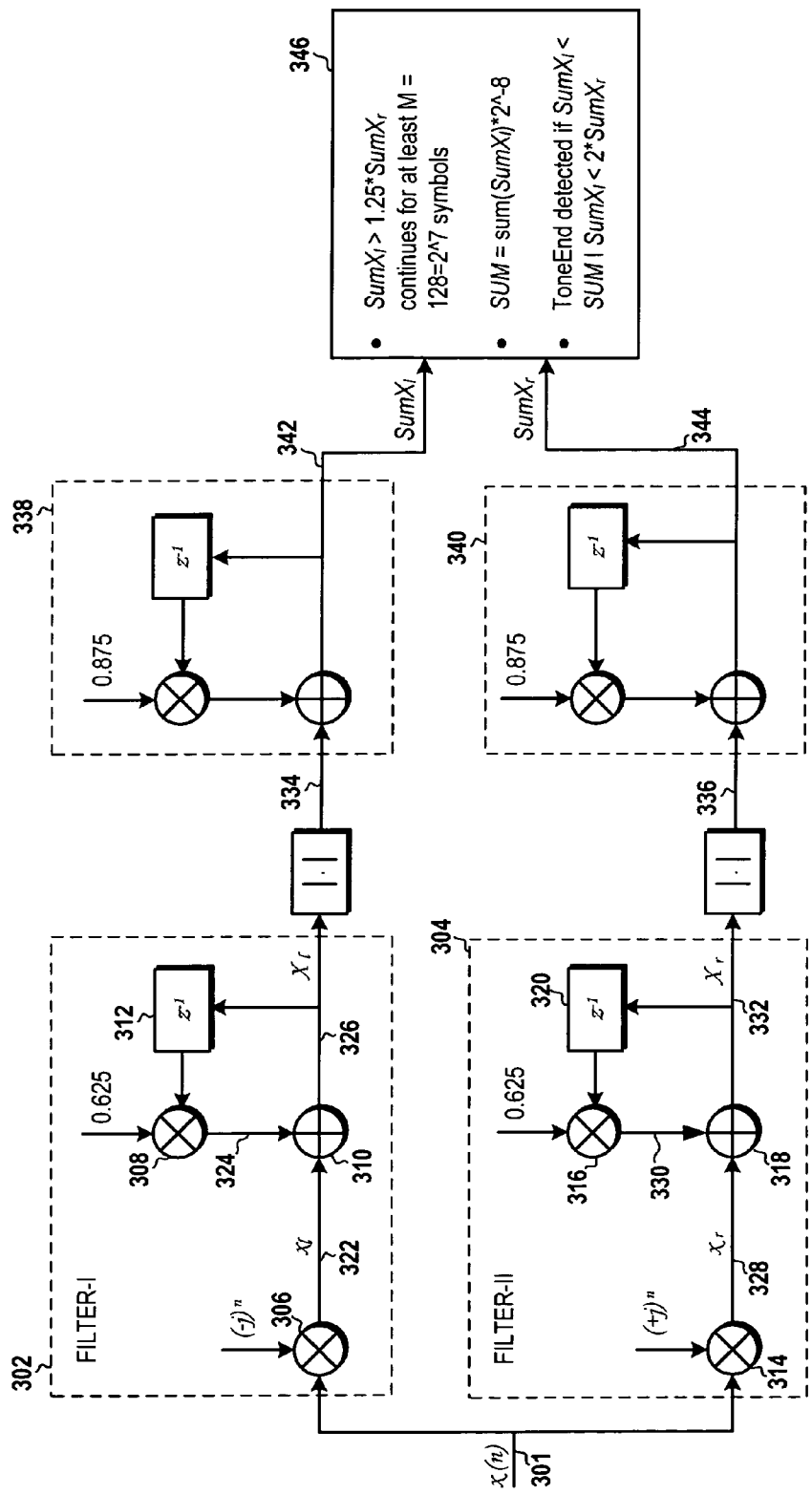
FIG. 3 shows a logical flow diagram of the process of FB tone detector, in accordance with a preferred embodiment of the present invention.

With reference now to FIG. 3, there shown a logical flow diagram of the process of FB tone detection, in accordance with a preferred embodiment of the present invention. The input to the tone detector is a discrete signal x(n) (301) sampled at one sample per symbol, where n represents a sample index, at the inputs of two different IIR filters, Filter-I (302) and Filter-II (304), shown in FIG. 3. Filter 302 comprises a frequency shifter 306, a multiplier 308, adder 310, and delay operator 312, where the multiplier 308, adder 310, and delay operator 312 form the single-pole low-pass filter, Similarly, filter 304 includes frequency shifter 314, multiplier 316, adder 318 and delay operator 320.

Each filter 302, 304 operate similarly. The frequency shifter in Filter-I is effectively left-shifting the incoming tone signal by an amount of 67.7 KHz from nominal FB tone center such that the FB tone becomes a DC signal after being shifted. Components 308-312 of the Filter-I form a simple low pass IIR filter that filters the FB tone, thereby detecting the FB tone energy. In a similar manner, Filter-II performs a right-shifting of the incoming tone signal to detect the energy of the incoming signal around the −67.7 KHz, where the FB signal has no energy.

The only difference between the Filter-I (302) and Filter-II (304) is the frequency shift direction of the respective frequency shifters 306, 314. Frequency shifter 306 shifts the received signal x(n) by −67.7 KHz, which is equivalent to a rotation of the input signal samples by −½ nπ, resulting in an output signal $x_l$ at the output 322. Frequency shifter 314 shifts the received signal x(n) by 67.7 KHz, which is equivalent to a rotation of the input signal samples by ½ nπ, resulting in an output signal $x_r$ at the output 328.

The frequency shifter output signal 322 passes through an IIR filter structure (308, 310, 312) to generate the IIR filter output $X_l$ (326). The IIR filter operates by delaying output 326 using delay operator 312 and multiplying the delayed output by a parameter α, which is a constant less then 1 to control the filter bandwidth, to generate feedback signal 324. In a preferred embodiment, α is set to 0.625 to simplify the multiplier 308 to a 2-bit multiply function. The feedback signal 324 is added to frequency shifter output signal 322 to generate the filtered output 326. In the same way, the frequency shifter output signal 328 passes through an IIR filter structure (316, 318, 320) to generate the IIR filter output $X_l$ (326).

Figure 4:
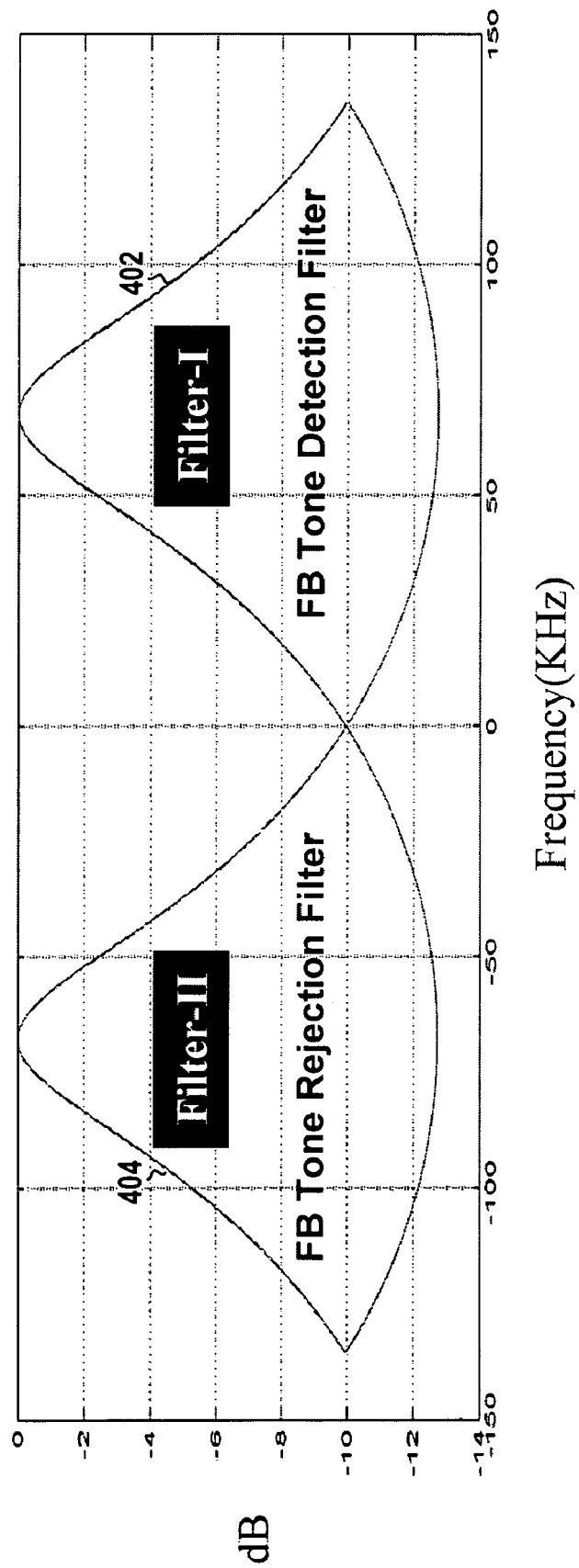
FIG. 4 shows a FIG. 4 shows a frequency response of the tone and interference filters, in accordance with a preferred embodiment of the present invention.

FIG. 4 shows a frequency response of the filters 302 and 304, represented by curves 402, 404, respectively. In a preferred embodiment, filter 302 is centered at the ¼ symbol rate or 67.7 KHz relative to the carrier center, and the band pass frequencies are designed to sufficiently detect the worst case of FB tone at ±19 KHz frequency uncertainty. As will be appreciated, filter 302 has a band pass within the expected range of the tone and is thus called the "FB Tone Detection Filter." Filter 302 is further designed to optimally reject non-FB signals.

Similarly, filter 304 is centered at −67.7 KHz relative to the carrier center. As will be appreciated, filter 304 has a band pass well outside the expected range of the tone and is used to detect the ambient power in a frequency domain that does not contain FB burst power. Accordingly, filter 304 is called the "FB Tone Rejection Filter."

With reference now back to FIG. 3, the magnitudes of filtered outputs $X_l$ 326 and $X_r$ 332 are derived and input as signals 334, 336 into low-pass filters 338, 340 respectively. Each of low pass filters 338, 340 include an delay element, multiplier and adder to generate the moving average of the filter 302 and 304 outputs. The moving average outputs, SUM $X_l$ 342 from low pass filter 338 and SUM $X_r$ 344 from low pass filter 340, are generated during FB tone detection.

Figure 5:
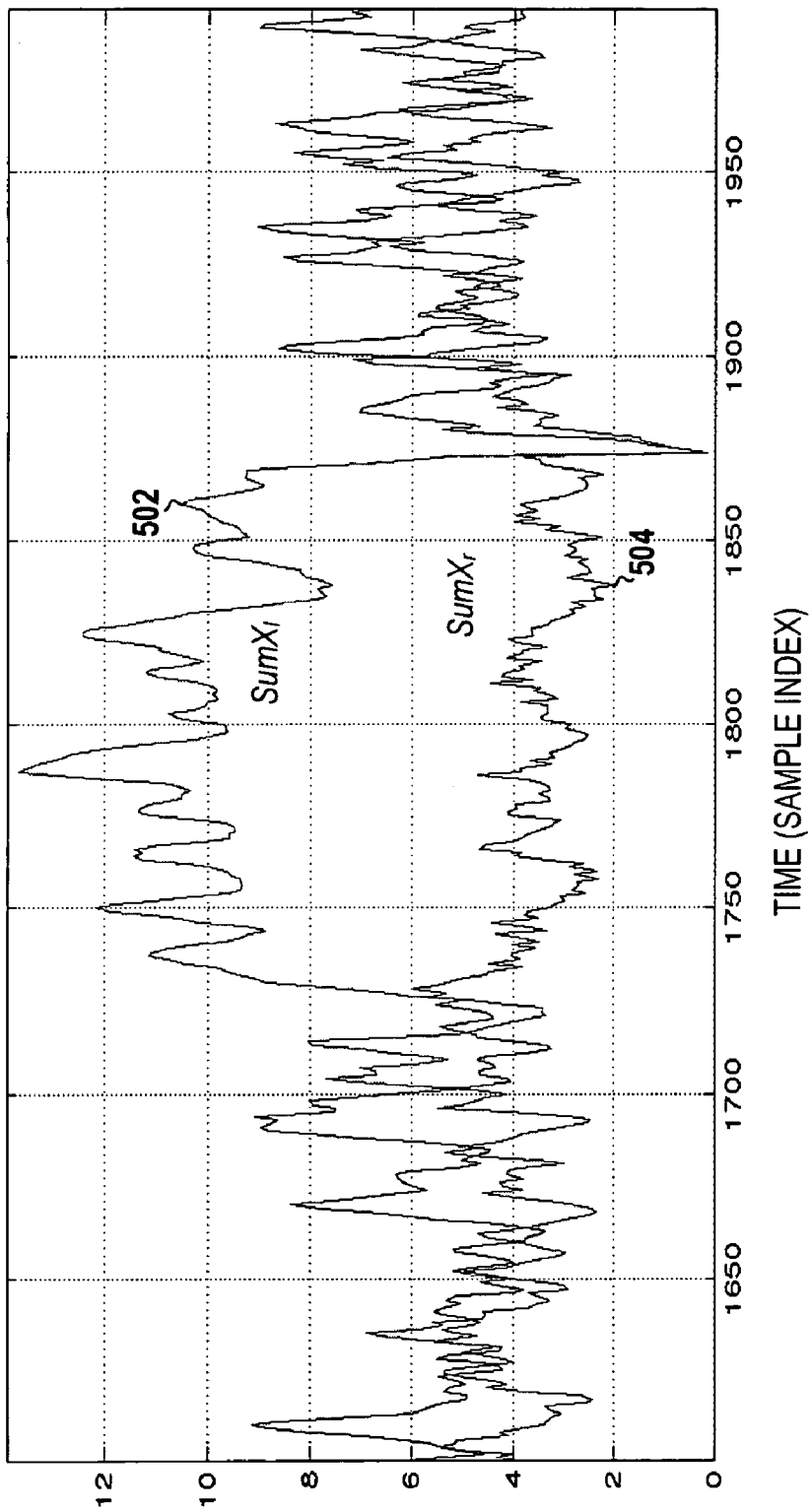
FIG. 5 shows the output signals SUM $X_l$ and SUM $X_r$ during a sample period when an FB tone is received.

The FB tone decision logic 346 utilizes the generated SUM signals 342, 344 to detect both the presence and endpoint of an FB burst. FIG. 5 shows an example of the output signal SUM $X_l$ (curve 502) and the output signal SUM $X_r$ (curve 504), when a FB tone is received. As seen at block 346 of FIG. 3, the FCCH tone detector examines the SUM $X_l$ and SUM $X_r$ signals to determine when SUM $X_l$ 342 is greater than a threshold value for a predetermined period of time, where the threshold value is set to some multiple of SUM $X_r$. For example, the threshold value is set to 1.25 times the SUM $X_r$ signal in a preferred embodiment. The FCCH tone detector determines when the SUM $X_r$ signal exceeds such a threshold for greater than 128 symbols (M=128=2^7). This functionality of detection logic can be represented by the rule:

$$Sum X_l > 1.25 * Sum X_r \text{ continues for at least } M=128=2^7 \text{ symbols}$$

Accordingly, the FCCH tone detector determines when the power output of the FB Tone Detection Filter is consistently higher than that of the FB Tone Rejection Filter for a period longer than a threshold period, thereby indicating that the single tone burst, and not standard signaling symbols, has occurred. In contrast, normal burst signal would be dispersed with generally the same signal power across the frequency spectrum and would not have the differential power to exceed the threshold.

The tone detector also detects the end of the FB tone. The end of the FB tone is detected if the Filter-I output power falls back below a second threshold, thereby indicating the tone has passed. The tone timing detection first calculates half the average of all $SumX_l$ signals over 128 samples as follows:

$$SUM = sum(Sum X_l) * 2^{-8}$$

In preferred embodiments, the end of the tone is then detected if either the $SumX_l$ drops below the half average (i.e. $SumX_l < SUM$) or, alternatively, $SumX_l$ drops below two times the $SumX_r$ signal (i.e. $SumX_l < 2*SumX_r$). Thus, the end of the FB tone is detected when the tone detection power drops below a threshold, for example, two times the rejection filter power output or half of the average power output of the tone detection filter output. In an alternative embodiment, the beginning of the tone is detected at the point in time when the Filter-I output power rises up above a selected threshold, for example the average of all energy signals (SUM).

As will be appreciated, this form of FB tone detection is not based on a local signal phase difference, and instead is based on the average of the FB tone power and interference power over a long period, thus having a higher performance. Moreover, the preferred embodiment of the present invention takes advantage of the complex valued received signal. signal, whereas the prior art is based on real-valued signal, treating the real and imaginary components independently. Moreover, the preferred embodiment of the present invention does not rely on tone frequency estimation using a local signal to estimate the tone energy, thereby enhancing the noise immunity. In the preferred embodiment of the present invention, the tone energy is estimated over a frequency band over a large moving time window that covers the tone uncertainty, instead of focusing on tone frequency detection within a narrow band as is seen in the prior art. Still further, the preferred embodiment, different from the prior art, separately estimates the interference energy over a different frequency band than the tone energy to generate maximum separation from the band where the tone energy is estimated, increasing performance.

While a preferred embodiment has been described as utilizing tone detection on GMSK modulated signals, the present invention is not restricted to detection of GMSK tone signals or using a tone detection method in the described manner, and may be implemented using other suitable detection methods and on other types of modulated signals. In a more general sense, the present invention is applicable to any single tone detection methodology. As will be further appreciated, the processes in preferred embodiments of the present invention may be implemented using any combination of software, firmware or hardware. As a preparatory step to practicing the invention in software, the processor programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. In a Global System for Mobile Telephony (GSM) digital communication system, a method for single tone detection in a received signal, said method comprising the steps of:
    filtering a received signal, which contains one or more frequency tone signals, within a first pass band centered at a first center and containing the one or more frequency tone signals to generate a first filtered signal;
    filtering the received signal within a second pass band centered at a second center different than the first center to generate a second filtered signal, wherein the second pass band does not contain all of the one or more frequency tone signals;
    calculating an tone energy for the first filtered signal, wherein the estimated tone energy is a function of the amplitude of the first filtered signal;
    calculating an interference energy for the second filtered signal, wherein the interference energy is a function of the amplitude of the second filtered signal; and
    detecting presence of a single frequency tone signal in response to the tone energy being greater than the interference energy by a threshold amount for a threshold period of time.

2. The method according to claim 1, further comprising the steps of frequency shifting the received signal by a first shift to create a first frequency shifted signal and by a second shift to create a second frequency shifted signal, and wherein the steps of filtering comprise filtering the first frequency shifted signal to generate the first filtered signal and filtering the second frequency shifted signal to generate the second filtered signal.

3. The method according to claim 2, wherein the first shift is $-\pi/2$ in the frequency domain.

4. The method according to claim 1, wherein the first center is centered at $\pi/2$ in the frequency domain.

5. The method according to claim 1, wherein the tone energy is the estimated tone energy and the interference energy is the estimated interference energy.

6. The method according to claim 1, further wherein the threshold amount is set so that the presence of the single frequency tone signal is detected in response to the tone energy being greater than the interference energy by greater than 1.25 times.

7. The method according to claim 1, wherein the threshold period of time is equal to 128 symbol periods.

8. The method according to claim 1, further comprising determining the end of the tone in response to detecting the tone energy being is less than an average of the tone energy over a defined period.

9. The method according to claim 1, further comprising determining the end of the tone in response to detecting the tone energy being is less than two times the interference energy.

10. The method according to claim 1, wherein the one or more frequency tone signals is a frequency burst tone of a GMSK modulation scheme.

11. The method according to claim 1, wherein the digital communications system is Global System for Mobile Telephony (GSM) compliant.

12. A computer-readable media including program logic embedded therein for causing an apparatus to perform the steps of claim 1.

13. A receiver in a Global System for Mobile Telephony (GSM) digital communication system comprising:
    a first frequency shifter configured to shift a received signal by a first predetermined frequency, the first frequency shifter outputting a first shifted signal;
    a first filter coupled to the first frequency shifter to filter the first shifted signal and generate a first filtered signal;
    a second frequency shifter configured to shift the received signal a second predetermined frequency, the second frequency shifter outputting a second shifted signal;
    a second filter coupled to the second frequency shifter to filter the second shifted signal and generate a second filtered signal;
    a first module coupled to the first filter configured to generate a first real signal derived from the first filtered signal;
    a second module coupled to the second filter configured to generate a second real signal derived from the second filtered signal;
    a third filter configured to filter the first real signal to derive estimated tone energy of the received signal;
    a fourth filter configured to filter the second real signal to derive estimated interference energy of the received signal; and
    decision logic configured to detect a tone when the estimated tone energy is greater than the estimated interference energy for a period longer than a threshold.

14. The receiver of claim 13, wherein the first predetermined frequency is $-\pi/2$ in the frequency domain.

15. The receiver of claim 13, further comprising decision logic configured to detect the end of the tone when the first real signal is less than a second threshold.

16. The receiver of claim 13, wherein the first and second filters are low pass filters approximately centered at $\pm\pi/2$ in the frequency domain.

17. The receiver of claim 13, further wherein the decision logic is configured to detect a tone when the filtered first real signal is greater than the filtered second real signal by greater than 1.25 times.

18. The receiver of claim 13, wherein the decision logic is configured to determine the end of the tone in response to detecting the filtered first real signal being is less than an average of the filtered first real signal over a defined period.

19. The receiver of claim 13, wherein the decision logic is configured to determine the end of the tone in response to detecting the filtered first real signal being is less than two times the filtered second real signal.

20. The receiver of claim 13, wherein the threshold is equal to 128 symbol periods.

21. The receiver of claim 13, wherein the first and second filters comprise two finite impulse response filters.

22. The receiver of claim 13, wherein the one or more frequency tone signals is a frequency burst tone of a GMSK modulation scheme.

23. The receiver of claim 13, wherein the digital communications system is Global System for Mobile Telephony (GSM) compliant.

* * * * *